United States Patent
Gaebel, deceased

[15] 3,658,293
[45] Apr. 25, 1972

[54] BUTTERFLY VALVE WITH AN ARTICULATED CONTROL

[72] Inventor: Ludwig Gaebel, deceased, late of Blieskasteler Strasse 43, Kirkel, Germany by Margot Gaebel, born Welsch, administratrix

[22] Filed: Jan. 20, 1971

[21] Appl. No.: 108,110

[30] Foreign Application Priority Data

Jan. 21, 1970 France..................................7002056

[52] U.S. Cl.............................................251/228, 251/298
[51] Int. Cl.........................................................F16k 31/52
[58] Field of Search................................251/213, 228, 298

[56] References Cited

UNITED STATES PATENTS 593,198   11/1897   Currier..................................251/228

Primary Examiner—Henry T. Klinksiek
Assistant Examiner—David R. Matthews
Attorney—J. Delattre-Seguy

[57] ABSTRACT

Butterfly valve having a butterfly element applied against its valve seat by a control device of the articulated type, the butterfly element being suspended from the valve body by link means. The control device includes a toggle structure so arranged that the toggle structure exerts its maximum force on the butterfly element, upon rotation of the control spindle of the control device, when the butterfly element is in, or is in the vicinity of, its position in which it is applied against the valve seat.

6 Claims, 7 Drawing Figures

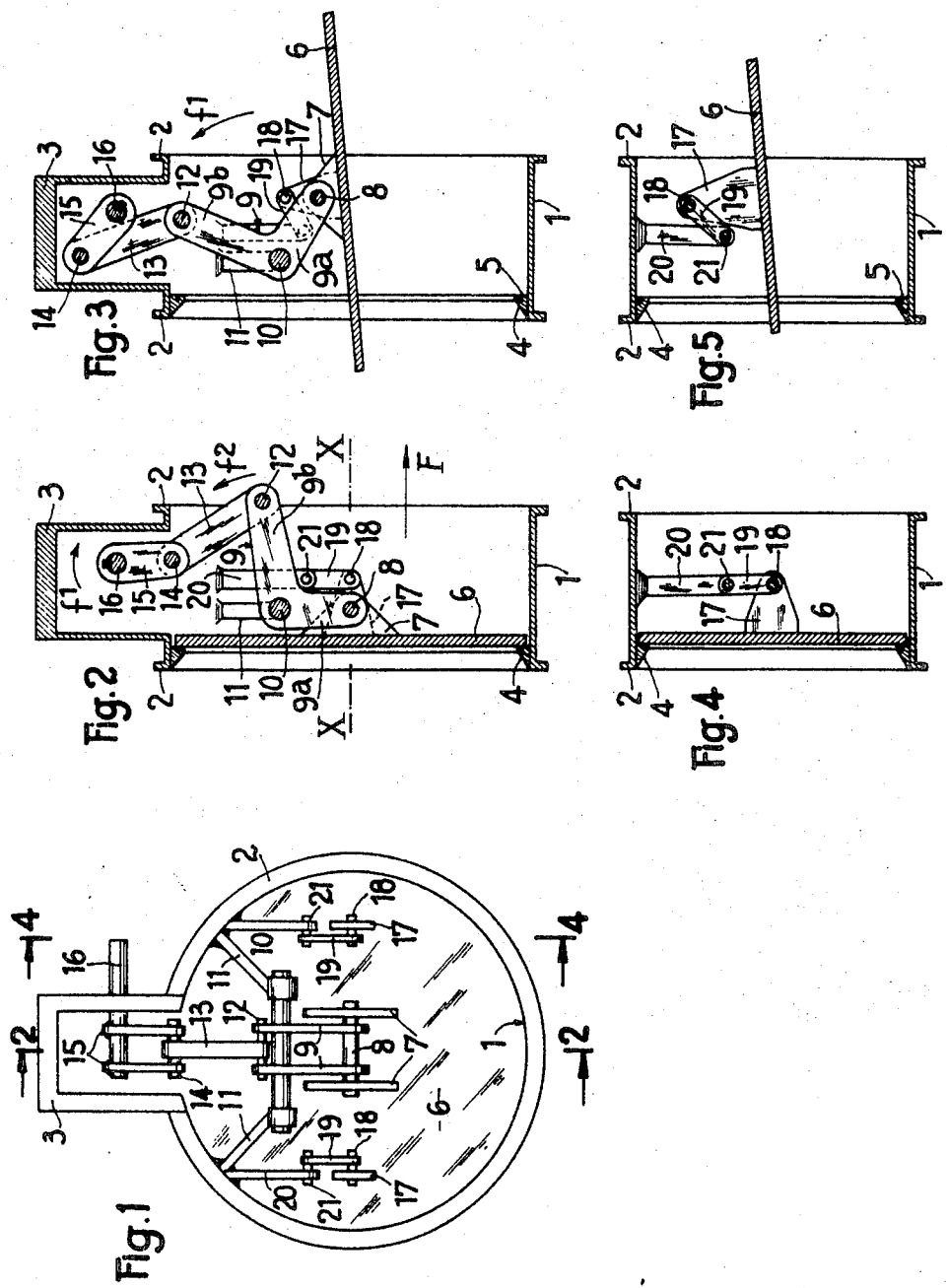

INVENTOR:
Ludwig GAEBEL
by: J. Delattre-Seguy
Attorney

BUTTERFLY VALVE WITH AN ARTICULATED CONTROL

The present invention relates to a butterfly valve with an articulated control capable of being closed in a fluidtight manner and of utility in particular in pipes for gases or fluids at high temperatures and/or at high pressures, such as gases and fluids for metallurgical furnaces, or steam generating and atomic stations.

In butterfly valves, with an articulated control of the known so-called "three-lever" type, the butterfly element is articulated in the middle on one of the free ends of a control lever whose pivot axis is carried by the valve body, the other end of this lever being connected to control means, the butterfly element being, furthermore, connected to the valve body by a link having one end journaled on a pivot pin articulated to the valve body and to the butterfly. The position of the various pivot points and the length of the levers are so chosen that, in the closed position, the butterfly element is applied against its seat and that, in the open position, the butterfly element has an orientation which is roughly parallel to the direction of flow of the fluid. When these valves are opened, the butterfly element, which is at the start perpendicular to the direction of flow of the fluid, first undergoes a movement of translation parallel to this direction and then a rotation and assumes an open position parallel to said direction of flow of the fluid.

In valves of this known type, the controlling or actuating force required for opening and closing the valve is of relatively high value. Indeed:

at the end of the closing or at the start of the opening, the butterfly element moves against the flow of the fluid;

owing to the use of a large lever controlling the butterfly element which multiplies the controlling torque required to shift the butterfly element, the butterfly element can only be shifted in respect of relatively small differences of pressure on each side of the butterfly element; further, for a constant controlling force, when opening or closing, the force exerted on the butterfly element decreases when the butterfly element is shifted from the open position to the closed position and increases when the butterfly element is shifted in the opposite direction; the force exerted on the butterfly element is therefore less when the butterfly element is in a position near to the closed position. Now, this is when a maximum force is required to be exerted on the butterfly element since the latter is roughly perpendicular to the flow of the fluid.

The object of the invention is to provide a butterfly valve with an articulated control which is so improved as to reduce the controlling force required to open and close the valve.

The butterfly valve according to the invention comprises at least one link suspending the butterfly element from the valve body and a control device for controlling the butterfly element, said device comprising an articulated toggle structure having one end connected to a control spindle and the other end journaled on one of two arms of a cranked lever pivoted to the valve body, the other arm of the cranked lever being pivoted to the butterfly element.

Owing to this arrangement, the control device, comprising the toggle structure and the cranked lever, is capable of closing or opening the butterfly valve even when the pressure differentials are relatively high on the opposite sides of the butterfly element and in particular when the butterfly element is roughly perpendicular to the flow of the fluid.

Further features and advantages of the invention will be apparent from the ensuing description with reference to the accompanying drawings.

In the drawings:

FIG. 1 is a diagrammatic front elevational view of a butterfly valve according to the invention;

FIG. 2 is a diagrammatic sectional view taken along line 2—2 of FIG. 1, the valve being in the closed position;

FIG. 3 is a similar diagrammatic sectional view, the valve being in the open position;

Figure 6:
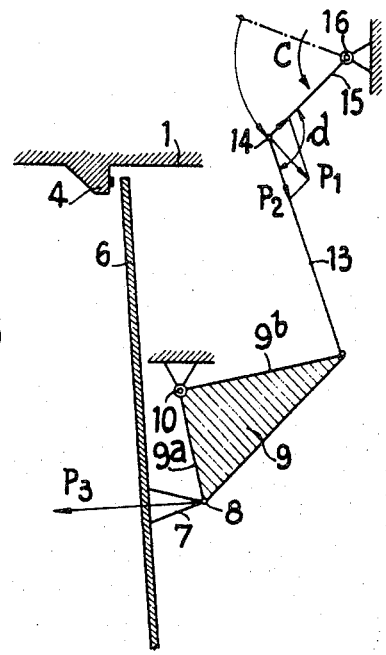
Figure 7:
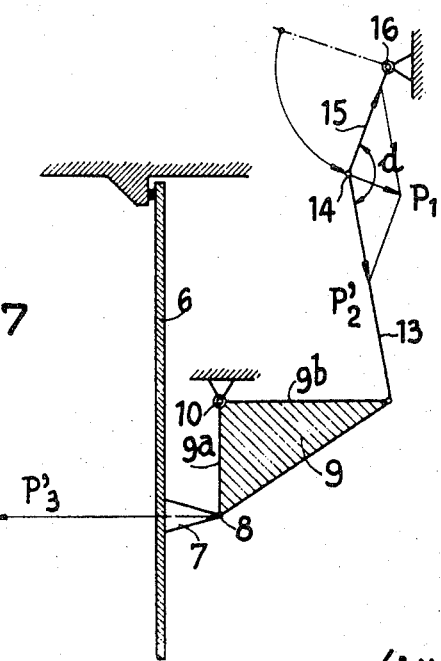

FIGS. 4 and 5 are diagrammatic sectional views taken along line 4—4 of FIG. 1, the valve being respectively in the closed position and in the open position, and FIGS. 6 and 7 are diagrammatic views of the control device of a valve according to the invention with the force diagrams respectively corresponding to a half-closed position and a closed position of the butterfly valve element.

In the illustrated embodiment, the tubular cylindrical body 1 of the valve is provided with connecting flanges 2. Inside this body there is secured an annular ring 4 having a shoulder 5 which acts as a valve seat. A butterfly or valve closing element 6 is mounted in the valve body 1. Two lugs 7 perpendicular to the element 6 pivotally mount the latter on a pivot pin 8. The pin 8 is parallel to the element 6 and carried by ends of a pair of arms $9^a$ of two parallel cranked levers 9 each of which has two arms $9^a$ and $9^b$. These levers are journaled on a spindle 10 which is parallel to the pin 8 and secured to the valve body 1 by two struts 11. The arms $9^b$ are longer than the arms $9^a$ and their ends are connected to a link 13 by a pin 12. The link 13 is pivotably mounted by a pin 14 on two arms 15 which are connected to a spindle 16 so as to rotate with the latter, for example by a keying. The link 13, the pin 14 and the arms 15 constitute a toggle structure.

The butterfly or valve closing element 6 is also pivotably mounted by two lugs 17 on two pivot pins 18. The axes of these pins are coaxial and parallel to the axis of the pin 8 in a common diametral plane of the valve body 1. Links 19 suspending the element 6 connect the pins 18 to struts 20 through two coaxial pivot pins 21.

The axes of all the pivot pins are parallel.

The butterfly valve operates in the following manner:

In the closed position, illustrated in FIGS. 1, 2, 4 and 7, the element 6 is applied against its seat 5. The pivot pins 8 and 18 are contained in a diametral plane X—X (FIG. 2) parallel to the direction F of the flow of the fluid. The closing force is exerted on the element 6 so as to apply it against its seat 5 by the control spindle 16 through the toggle structure 15, 14, the cranked levers 9 and the lugs 7.

To open the butterfly valve, the control spindle 16 is rotated in the direction of the arrow $f^1$ (FIG. 2), that is, in the clockwise direction as viewed in FIG. 2. This spindle drives the arms 15 integral therewith. Movement of the arms 15 is transmitted through the link 13 to the cranked levers 9 which are pivoted about the pin 10 in the direction of the arrow $f^2$, that is, in the counterclockwise direction. As the shorter arms $9^a$ of the levers are roughly parallel to the element 6 in the closed position, the first movement of the element 6 during this rotation of the control or drive spindle 16 is a rearward movement of the element 6 away from the seat 5 of the valve body 1, the element 6 assuming a position substantially parallel to the seat 5. In a second stage of the opening of the valve, as the spindle 16 continues its rotation, the element 6 pivots about the pin 8 and assumes a position roughly parallel to the direction of flow F of the fluid, namely roughly perpendicular to the plane of the seat 5 (FIG. 3). In the open position of the valve, the pins 8 and 18 are contained in a transverse plane roughly perpendicular to the flow of the fluid since in the course of the rotation of the levers 9 there is also a rotation of the links 19 on the pins 21 integral with the valve body 1. The pivot points 21, 18, 8 and 10 and the lengths of the arms $9^a$ of the levers 9 and the length of the link 19 are so chosen that the element 6, at the moment of closing the valve, is applied front-on against the seat 5 whereas when opening, the valve element 6 is shifted away from its seat and assumes a position roughly parallel to the flow of the fluid.

The advantages of the invention are the following:

As the element 6 is shifted from its seat 5 practically in translation, when opening the valve, before rotating and as the element 6 first rotates about the pin 8 and then moves in translation in a direction parallel to the direction F of the flow of the fluid and then applies itself against the seat 5 when closing the valve, the valve is opened and closed without a sliding of the element 6 on the seat 5 and there is consequently no wear of the seat lining or member 5.

As shown in FIG. 6, if a given shifting torque C is applied to the spindle 16, this is converted into a force $P_1$ on the pin 14 tangent to the circle of rotation of this pin 14 about the spindle 16. This force $P_1$ has a component force $P_2$ along the link 13. If the arms $9^a$ and $9^b$ of the pairs of levers 9 have respectively lengths $a$ and $b$, the force $P_3$ exerted on the element 6 is equal to $(b/a) P_2$. If the closing position is approached, the angle $d$ between the link 13 and the arms 15, constituting the toggle structure, increases. The component $P_2$ of the force $P_1$ exerted on the link 13 increases and this increases the force exerted on the element 6 (compare the values $P'_2$ and $P'_3$ in FIG. 7 with the values $P_2$ and $P_3$ in FIG. 6).

Further, if the arms $9^a$ are shorter than the arms $9^b$ ( $a$ less than $b$ ), the force $P_3$ or $P'_3$ exerted on the element 6 is the product of $b/a$ multiplied by the force $P_2$ or $P'_2$, the cranked levers 9 thus being multipliers of the forces.

Thus it is clear that:

for a given actuating or control force C exerted by the control spindle 16, the force applied to the element 6 increases when the latter approaches the closing position; this is the main advantage of the invention since the nearer the element 6 is to the position perpendicular to the flow of the fluid, that is the more it opposes the flow of the fluid, the higher the force exerted on the element 6;

the cranked levers 9 having arms $9^a$ shorter than the arms $9^b$, multiply the force exerted on the element 6 for a given force $P_1$.

Owing to this control or actuating device, it is therefore possible to employ the valve in cases where the pressure differential between the upstream and downstream sides of the valve is large and in the case of the utilization of large-diameter valves.

A modification of the invention would be to place the link 19 and the strut 20 on the side of the element 6 opposed to the control device.

Having now described the invention what is claimed and desired to be secured by Letters Patent is:

1. A butterfly valve comprising a hollow valve body, a butterfly element located within said body, first link means pivotably mounted in said body at a first end of the link means and pivotably connected to said butterfly element at a second end of the link means so as to suspend said butterfly element from the valve body, and a control device for controlling the position of the butterfly element, said device comprising a control spindle rotatably mounted in said body, a cranked lever pivoted to said valve body and having a first arm and a second arm which is pivoted to said butterfly element, and an articulated toggle structure having a first end connected to rotate with said control spindle and a second end pivoted to said first arm of said cranked lever.

2. A butterfly valve as claimed in claim 1, wherein said first arm of said cranked lever is longer than said second arm of said cranked lever.

3. A butterfly valve as claimed in claim 1, wherein said link means and said control device are placed on the same side of said butterfly element.

4. A butterfly valve as claimed in claim 1, wherein said link means and said control device are placed on opposite sides of said butterfly element.

5. A butterfly valve comprising a hollow body having a center axis, a butterfly element located in and coaxial with said body, a valve seat for said butterfly element, a first link means having a first end pivoted to said body and a second end pivoted to said butterfly element substantially in a transverse plane containing said axis so as to suspend said butterfly element inside said body, and a control device for controlling the position of said butterfly element with respect to said body, said device comprising a control spindle rotatably mounted in said body, a cranked lever pivoted to said body by a pivot pin and having a first arm and a second arm which is pivoted to said butterfly element substantially in said transverse plane, and a toggle structure comprising a first element having one end integral with said control spindle and a second end and a second element having a first end pivoted to said second end of said first element and a second end pivoted to said first arm of said cranked lever, said first and second elements of said toggle structure being so arranged with respect to said butterfly element and said valve seat that substantially maximum force is exerted by said toggle structure on said first arm upon rotation of said control spindle when said butterfly element is substantially in a position in which said butterfly element is applied against said valve seat.

6. A butterfly valve as claimed in claim 5, wherein said pivot pin pivoting said cranked lever to said body and said pivotal connection of said second arm to said butterfly element are contained in a plane substantially parallel to a plane containing said valve seat when said butterfly element is applied against said valve seat, and said link means is substantially parallel to said plane containing said valve seat, whereby, when opening said valve, said butterfly element first moves away from said valve seat in a direction substantially perpendicular to said plane of said valve seat.

* * * * *